United States Patent [19]

Waddill

[11] 4,178,426
[45] Dec. 11, 1979

[54] EPOXY RESIN COMPOSITIONS
[75] Inventor: Harold G. Waddill, Austin, Tex.
[73] Assignee: Texaco Development Corp., White Plains, N.Y.
[21] Appl. No.: 881,500
[22] Filed: Feb. 27, 1978
[51] Int. Cl.² .................... C08G 59/56; C08G 59/60
[52] U.S. Cl. ............................ 528/111; 528/98; 528/120; 528/367; 528/407; 525/307
[58] Field of Search .............. 528/111, 98, 135, 367, 528/407; 260/830 R

[56] References Cited

U.S. PATENT DOCUMENTS

| | | | |
|---|---|---|---|
| 3,324,176 | 6/1967 | Kirschnek et al. | 260/553 |
| 3,580,887 | 5/1971 | Hubin | 260/47 |
| 3,717,612 | 2/1973 | Babayan | 260/47 EN |
| 3,730,915 | 5/1973 | Tomalia et al. | 260/2 N |
| 3,758,421 | 9/1973 | Nickles | 260/2 N |
| 3,763,177 | 10/1973 | Tomalia et al. | 260/307 F |
| 4,002,598 | 1/1977 | Waddill et al. | 260/47 EN |
| 4,110,309 | 8/1978 | Schulze et al. | 528/119 |

Primary Examiner—Earl A. Nielsen
Attorney, Agent, or Firm—Carl G. Ries; Thomas H. Whaley; James L. Bailey

[57] ABSTRACT

The adhesion properties of amine-cured epoxy resins are enhanced by addition of certain polyether diureide additives in combination with specific amine curing agents. The adhesively superior epoxy resin composition comprises a vincinal polyepoxide, a curing amount of an aminopropyl ethylenediamine curing agent, and an effective amount of a polyether diureide having terminal ureido or monosubstituted ureido groups and a molecular weight of from about 2000 to about 3000.

12 Claims, No Drawings

EPOXY RESIN COMPOSITIONS

BACKGROUND OF THE INVENTION

1. Field of the Invention

This invention relates to curable epoxy resins having increased adhesive strength; and, more particularly, to certain amine cured epoxy resins containing certain polyether diureide additives.

2. Description of the Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the amines. The most commonly used amine curing agents are aliphatic amines such as diethylenetriamine, triethylenetetramine and the like and/or polyoxyalkylene polyamines; such as polyoxypropylenediamines and triamines.

Epoxy resin compositions having improved physical properties are obtained by employing polyoxyalkyleneamines, and polyoxyalkylenediamines in particular, as curing agents. It is common to employ with such expoxy resin compositions a co-curing agent such as those described in U.S. Pat. No. 3,549,592.

Also known to be effective as epoxy curing agents or co-curing agents are various ureas and substituted ureas, such as those disclosed in U.S. Pat. Nos. 3,294,749, 2,713,569, 3,386,956, 3,386,955, 2,855,372 and 3,639,338. The ureas disclosed in the above references are useful as either curing agents or as curing accelerators.

Aliphatic or aromatic compounds having a single terminal ureido group are well known. It has been disclosed in U.S. Pat. No. 2,145,242 to Arnold that diureido terminated aliphatic compounds can be produced by reacting an aliphatic diamine wherein each terminal amine has at least one labile hydrogen with urea. Other substituted ureas are disclosed in U.S. Pat. No. 3,965,072.

It has now been unexpectedly found that a specific diureide terminated polyoxyalkylene material having a molecular weight of from about 2000 to about 3000, when employed as an epoxy additive in combination with an aminopropyl ethylenediamine curing agent, provides cured epoxy resin compositions exhibiting outstanding strength of adhesion. Specifically, epoxy resins incorporating these additives, upon curing, provide a material with high tensile shear strength and superior adhesion to substrates. Use of the specific amine curing agents leads to strong adhesive bonds and avoids the problem of brittleness which arises when similar amine curing agents are used.

SUMMARY OF THE INVENTION

According to the broad aspects of the instant invention, the adhesive strength of amine-cured epoxy resins is enhanced by the addition of an effective amount of a polyether diureide having terminal ureido or monosubstituted ureido groups and having a molecular weight of from 2000 to about 3000 in combination with bis(3-aminopropyl) ethylenediamine or 3-amino propyl ethylenediamines.

In one aspect, a curable epoxy resin composition having superior adhesive strength comprises a vicinal polyepoxide, a curing amount of the above amine curing agent and an effective amount of the polyether diureide additive.

In accordance with a preferred embodiment, a diglycidyl ether of 4,4'-isopropylidene bisphenol, a curing amount of the just-mentioned curing agent and an effective amount of a polyether diureide having terminal ureido groups and a molecular weight of about 2000 are utilized to form a resin.

DETAILED DESCRIPTION OF THE INVENTION

According to the instant inventive concept, blends of a polyepoxide, an amino propyl ethylenediamine curing agent and the diureido or mono-substituted diureido terminated polyether containing compounds are thoroughly admixed and cured in accordance with conventional methods to provide cured epoxy resins having unexpectedly superior adhesive strength without suffering from brittleness found through use of other amine curing agents. Optionally other additives may be present such as an accelerator.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolymethane, 4,4'-dihydroxydiphenyltolymethylmethane and the like. Other polyhydric phenols which may also be coreacted with an epihalohydrin to provide these epoxy polyethers are such compounds as resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which when combined with the urea additives described in more detail below which give unexpected curative results are 3-aminopropyl ethylenediamine or bis(3-aminopropyl)ethylenediamine. As will be seen in more specific detail, such particular ethylenediamine derivatives in combination with said urea additives form surprisingly strong adhesive bonds. The adhesive system which can be cured rapidly at ambient temperatures develops a level of adhesive strength not obtained with similar amine curatives. Thus, when such typical amine curing agents as diethylenetriamine or triethylenetetramine are employed as curing agents, adhesive bonds are prepared which are brittle and without the requisite strength surprisingly developed through use of the 3-aminopropyl derivatives of ethylenediamine. Yet, in terms of amine content the diethylenetriamine or triethylenetetramine types of compounds apparently possess as much "amino character" as the amine additives employed here, and yet are clearly inferior as amine curing agents.

The polyether diureide additive can generally be described as polyoxyalkylene containing materials having terminal ureido or mono-substituted ureido groups and a molecular weight of from about 2000 to about 3000. More specifically, these compounds are polyoxyalkylene compounds having terminal ureido groups, of the formula:

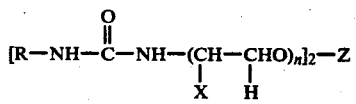

wherein R is hydrogen; or, a branched or straight chain alkyl radicals of from 1 to about 10 carbon atoms, and more preferably from 1 to about 6; or a monocyclic aryl, alkaryl or aralkyl having from 6 to about 12 carbon atoms; and more preferably 6 to about 8; or, are branched or straight chain alkenyl or alkadienyl radical of from 2 to about 10 carbon atoms and more preferably 3 to about 8; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000. The preferred diureides are of the above formula wherein R is hydrogen or a lower alkyl radical, and more preferably a lower alkyl radical of from 1 to 4 carbon atoms; X is a methyl radical; Z is a 1,2-propylene radical; and n is a number from 16 to 19. Preferred lower alkyl groups include methyl, ethyl, n-propyl and n-butyl.

The polyether diureide compounds are formed by the reaction of a ureido or mono-substituted ureid forming compound with a polyoxyalkylene diamine having a molecular weight value such that the ureido containing product has a molecular weight of from about 2000 to about 3000 at temperatures in the range from about 25° C. to about 150° C. in a molar ratio of about 2 moles of ureido or mono-substituted ureido forming compound for each mole of diamine.

The diamines that are useful in forming the additives are polyoxyalkylene diamines of the formula:

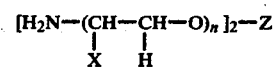

wherein X is a hydrogen, a methyl radical or an ethyl radical; Z is a hydrocarbon alkylene radical having from 2 to 5 carbon atoms; and, n is an average number of from about 15 to about 25. Preferred polyoxypropylene diamines are those wherein X is a methyl radical, n is an average number from 16 to 19, and Z is a 1,2-propylene radical. These polyoxyalkylene polyamines can be prepared by known methods as disclosed in U.S. Pat. Nos. 3,236,985 and 3,654,370.

The ureido forming compounds are generally those which supply the O=C—NH$_2$ radical. Urea is preferred. When urea is employed as a reactant, the reaction proceeds with the evolution of ammonia and the terminal primary amino groups of the polyoxyalkylenepolyamine are converted directly to ureido groups.

While urea is the preferred ureido forming compound, other ureido forming compounds can be utilized. Since the polyoxyalkylenepolyamine reactant already contains terminal primary amino groups, isocyanates of the general formula M$^+$NCO$^-$, wherein M$^+$ is generally an alkali metal such as potassium, sodium and the like, can be used. The preferred isocyanates that can be used in accordance with the instant invention are sodium and potassium isocyanate primarily because of availability.

The mono-substituted ureido forming compounds are generally isocyanates of the formula R—N=C=O wherein R has the character of either an aliphatic or aromatic monovalent hydrocarbon radical as defined herein above.

In accordance with this method, the reactants are simply admixed in correct molar ratios in a suitable reaction vessel and heated, if necessary, until the reaction occurs.

The functionality of the polyoxyalkylenepolyamine is dependent upon the number of terminal primary amino groups which in the instant case is 2. It will be realized that each mole of ureido forming compound or substituted ureido forming compound will react with a single terminal primary amino group of the polyoxyalkylenepolyamine. It is particularly important that, in forming the additive compounds of the instant invention, a specific molar ratio of reactants be maintained. Specifically, about 1 mole of ureido forming compound for each amino group of the polyoxyalkylenepolyamine is required. Thus, with the diamine, about 2 moles of ureido forming compound is utilized. Preferably the instant reaction is carried out in the presence of a slight excess of ureido forming compound to assure complete conversion of the amino groups.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7-14 describes the use of certain amine-containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072 issued to H. G. Waddill, Apr. 1, 1975. The accelerator comprises a combination of piperazine and an alkanol amine in a weight ratio of about 1:8 to 1:1.

The amount of urea additive effective in bringing about the increased adhesive property is somewhat empirical and will depend upon the type of resin, the amount of amine curing agent, the use or not of an accelerator, etc. Generally, the diureido additive can be utilized in amounts from about 2 to about 50 parts by weight based on one hundred parts by weight of the resin constituent. More preferably 2-30 parts by weight are used and most preferably 5-10 parts by weight.

Although somewhat empirical, the exact amount of additive used to increase adhesion can readily be determined without undue experimentation owing to the fact that a resin mixture containing an effective amount of the additive will undergo changes which are readily visible as curing proceeds. Specifically, the curing resin takes on an opaque, milky white appearance that becomes more pronounced during curing and results in a product which has a lustrous white appearance. It will be realized that, advantageously, this optical absorption shift enhances the beauty of cast objects and negates the need to use white pigments or fillers.

Preferably the adhesive properties of prior art resins are enhanced by addition of an effective amount of the polyoxypropylene diureide additive based upon the condensation of 2 moles urea with 1 mole of a polyoxypropylenediamine having molecular weight of about 2000. The preferred resins comprise polyglycidyl ethers of a polyhydric phenols cured by incorporating therein a curing amount of a polyoxyalkylenepolyamine of molecular weight from about 200 to 500 and the amino propyl ethylenediamine curing agent.

The curable epoxy resin compositions of the instant invention generally comprise a vicinal polyepoxide, a curing amount of the amine curing agent and an effective amount of the polyether diureide additive. Optionally an accelerator can be added.

The amine cured resins having superior adhesion in accordance with the instant invention are prepared in a conventional manner. The amine curing agent is admixed with the polyepoxide composition in amounts according to the amine equivalent weight of the curing agent employed. Generally the number of equivalents of amine groups is from about 0.8 to about 1.2 times the number of epoxide equivalents present in the curable epoxy resin composition, with a stoichiometric amount being preferred. Amounts of amine curing agent from 1 to about 10 parts by weight based on 100 parts by weight of the resin are generally satisfactory. The exact amount of constituents in accordance with the above general requirements will depend primarily on the application for which the cured resin is intended.

The diureido additive is incorporated into the uncured resin by admixing. Preferably, the additive is first admixed with the curing agent and optimally an accelerator prior to addition to the resin. The constituents forming the curable material are then intimately admixed by standard methods and degased in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and most preferably 100% by weight has been shown to greatly enhance the desirable properties of the cured material, especially the adhesive strength.

According to a greatly preferred embodiment, stoichiometric amounts of the resin and amine curing agent are utilized. This amount is calculated by adding together the number of equivalents on the basis of weight per replaceable N—H group. More preferably, based on the above calculations, the curing agent is utilized in amounts which provide up to about a 10% excess of the stoichiometric amount required based on the resin. However, broadly the amount of amine curing agent may be ±10% of the stoichiometric amount required.

Generally, the mixture of epoxy resin, the polyether diureido, and curing agent is allowed to self-cure at ambient temperatures of between 0° C. to about 45° C. However, the mixture can be cured or post-cured at elevated temperatures of up to about 135° C.

In another preferred embodiment, resins of the polyglycidyl ether of polyhydric phenol type are cured by incorporating therein about a stoichiometric amount of the amine curing agent; and from about 2 to 30 parts by weight of the polyether diureido terminated polyoxyalkylenepolyamine having a molecular weight of about 2000. The composition is cured at room temperature (about 25° C.) to produce products having superior adhesive strnegth in accordance with the instant invention which avoids the problem of brittleness associated through use of other amine curing agents.

It will further be realized that various conveniently employed additives can be admixed with the polyepoxide containing composition of the instant invention prior to final cure. For example, in certain instances it may be desired to add minor amounts of other prior art amine curing agents.

Additionally, conventional pigments, dyes, fillers, flame retarding agents and the like which are compatible as well as, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used. One outstanding feature of the instant composition resides in the fact that they are opaque upon curing and give a smooth, white lustrous surface which may be of particular benefit for certain molding and casting operations. The compositions of the instant invention can be used as impregnants, surface coatings, pottings, capsulating compositions, laminants, and, particularly and most importantly, as adhesives for bonding metallic elements or structures permanently together.

The following examples illustrate the nature of the instant invention but are not intended to be limitative thereof. These examples particularly illustrate the unique results obtained through use of the particular amine curing agents having special application here in combination with the urea additives described.

EXAMPLE I

In this example a polyether diureido terminated additive for use in accordance with the instant invention, was prepared. Into a suitable reaction vessel, equipped with stirring apparatus, were added 1980 grams (1 mole) of a polyoxypropyleneamine having a molecular weight of approximately 2000, and an analysis of 1.01 milliequivalents (meq.) primary amine/g sold under the tradename "JEFFAMINE® D-2000" by Jefferson Chemical Co., Houston, Tex. and 180 grams of urea (3.0 moles). The admixture was flushed with nitrogen and stirred under a nitrogen pad for 2 hours at 130°–134° C. A second portion of "JEFFAMINE® D-2000" consisting of 990 grams (0.5 moles) was added over a 3 hour period at a temperature of about 132° C. The reaction mixture was maintained at 134° C. for another 70 minutes, during which time the admixture was vigorously stirred to continuously wash the sublimate on the upper surface of the reaction vessel. The crude reaction product was then stripped at 130° C./1.4 mm Hg to produce a viscous residue which upon analysis showed 2.54% N, 0.01 meq. total amine/g.

EXAMPLE II

In this example a bis(N-substituted ureido) terminated material, for use in accordance with the instant invention, was prepared. According generally to the procedure of Example I, 891 g of polyoxypropylenediamine of an approximate molecular weight of 2000 sold under the tradename "JEFFAMINE®" D-2000" by Jefferson Chemical Co., Inc., Houston, Tex. was charged to the apparatus described in Example I. In a nitrogen atmosphere over a period of 45 minutes, 109 g of phenylisocyanate were added to the stirred polyoxypropylenediamine at a temperature of about 55° C. The temperature was raised to 60° C. and the admixture was stirred an additional two hours. The corresponding bis(N-phenyluriedo) terminated compound was recovered and upon analysis showed 2.2% N; 0.009 meq total amine/g.

EXAMPLE III

To illustrate the advantages of use of the specific combination of the polyureide additives and aminopropyl ethylenediamine curing agents of this invention, a diglycidyl ether of 4,4'-isopropylidine bisphenol epoxy resin was treated and cured with said combination. The cured products were subjected to the standard tensile shear strength test (ASTM D-1002-64) to measure the adhesive bonds. All substrates were aluminum panels (No. 2024-T-3 alloy, 16 gage) degreased, then chromic acid etched prior to bonding.

As seen in Tables I and II below, excellent tensile shear strenth could be developed at room temperature using the urea additives of the invention in combination with the specific amine curing agents found unexpectedly desirable here.

TABLE I

Tensile Shear Strength vs. Time: Curing with 3-Aminopropylethylenediamine (APEDA)

| FORMULATION-PARTS BY WEIGHT | | 1 | 2 | 3 | 4 |
|---|---|---|---|---|---|
| Epoxy resin (Eq. wt. 185) | | 100 | 100 | 100 | 100 |
| APEDA | | 12 | 12 | 12 | 12 |
| Diureide, Example I | | — | 2 | 5 | 10 |
| Tensile shear strength psi after curing at ~25° C. for: | 4 hours | 1 | 1000 | 1000 | 1000 |
| | 8 hours | 600 | 1200 | 1600 | 1800 |
| | 24 hours | 800 | 1300 | 1900 | 1700 |
| | 48 hours | 1100 | 1500 | 2100 | 3700 |
| | 72 hours | 900 | 1300 | 1700 | 2500 |
| | 96 hours | 1100 | 1600 | 4000 | 2900 |
| | 7 days | 1100 | 1800 | 3600 | 3700 |

[1] Bond was without strength; could not be tested.

TABLE II

Tensile Shear Strength vs. Time: Curing with Bis(3-Aminopropyl)ethylenediamine (BAPEDA)

| FORMULATION-PARTS BY WEIGHT | | 5 | 6 | 7 | 8 |
|---|---|---|---|---|---|
| Epoxy resin (Eq. wt-185) | | 100 | 100 | 100 | 100 |
| BAPEDA | | 15 | 15 | 15 | 15 |
| Diureide, Example I | | — | 2 | 5 | 10 |
| Tensile shear strength psi after curing at ~25° C. for: | 4 hours | 900 | 1000 | 1000 | 900 |
| | 8 hours | 1900 | 2300 | 3400 | 3200 |
| | 24 hours | 1400 | 1900 | 3200 | 3600 |
| | 48 hours | 1000 | 1900 | 3600 | 3600 |
| | 72 hours | 900 | 2500 | 3800 | 3800 |
| | 96 hours | 1300 | 2800 | 3500 | 4000 |
| | 7 days | 1500 | 2700 | 3800 | 3900 |

EXAMPLE IV

Here a direct comparison was made between an amine curing agent of the invention and a seemingly similar curing agent, triethylenetetramine, and the cured epoxy resins compared with respective tensile shear strength. In this instance, tensile shear strength was measured after 7 days room temperature cure. As can be seen from Table III below use of the 3-aminopropyl ethylenediamine curing agent compared to the triethylenetetramine curing agent gave surprising results in terms of enhanced tensile shear strength.

TABLE III

| FORMULATION | 9 | 10 |
|---|---|---|
| Epoxy resin (Eq. wt.-190) | 100 | 100 |
| Triethylene tetramine | 12 | — |
| 3-Aminopropyl Ethylenediamine | — | 12 |
| Diureide, Example I | 5 | 5 |
| Tensile shear strength | 2100 | 3450 |

In addition it was found that the adhesive bond developed through use of triethylenetetramine was excessively brittle compared to the bond developed with the 3-aminopropyl ethylenediamine curing agent.

While the invention has been explained in relation to its preferred embodiment, it is to be understood that various modifications thereof will become apparent to those skilled in the art upon reading the specification and is intended to cover such modifications as fall within the scope of the appended claims.

I claim:

1. An epoxy resin composition having superior adhesion properties and being the cured product of a curable admixture which comprises:
   a vicinal polyepoxide having an epoxide equivalency of greater than 1.8;
   a curing amount of a polyamine curing agent comprising 3-aminopropyl ethylenediamine or bis-(3-aminopropyl) ethylenediamine; and,
   an effective amount of an additive consisting essentially of a polyether diureide having terminal ureido or mono substituted ureido groups said diureide having the formula:

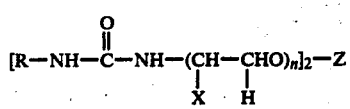

wherein R is hydrogen, or a branched or straight chain alkyl radical of from 1 to about 10 carbon atoms, or a monocyclic aryl, alkaryl or aralkyl radical having from 6 to about 12 carbon atoms; or, a branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

2. The composition of claim 1 wherein R is hydrogen or a lower alkyl; X is a methyl radical; Z is a 1,2-propylene radical; and n is an average number from 16 to 19.

3. The composition of claim 1 wherein R is hydrogen.

4. The composition of claim 2 wherein R is a lower alkyl radical selected from the group consisting of methyl, ethyl, n-propyl and n-butyl.

5. The composition of claim 2 wherein said vicinal polyepoxide is more than 80% by weight of a polyglycidyl ether of a polyhydric phenol.

6. The composition of claim 5 wherein said vicinal polyepoxide is a polyglycidyl ether of a polyhydric phenol.

7. A method for increasing the adhesive strength of an epoxy resin composition which comprises the steps of adding to an epoxy resin comprising a vicinal polyepoxide having an epoxide equivalency of greater than 1.8, an effective amount of a polyether diureide additive having a molecular weight of about 2000 to about 3000 and a curing amount of 3-aminopropyl ethylenediamine or bis-(3-aminopropyl)ethylenediamine to provide a curable admixture and curing said admixture said diureide having the formula:

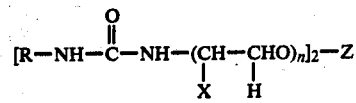

wherein R is hydrogen, or a branched or straight chain alkyl radical of from 1 to about 10 carbon atoms, or a monocyclic aryl, alkaryl or aralkyl radical having from 6 to about 12 carbon atoms; or, a branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has said molecular weight.

8. The method of claim 7 wherein R is hydrogen or a lower alkyl; X is a methyl radical; Z is a 1,2-propylene radical; and n is an average number from 16 to 19.

9. The method of claim 8 wherein R is hydrogen.

10. The method of claim 8 wherein R is a lower alkyl radical selected from the group consisting of methyl, ethyl, n-propyl and n-butyl.

11. A curable resin composition comprising a diglycidyl ether of 4,4'-isopropylidene bisphenol polyepoxide; a curing amount of 3-aminopropyl ethylenediamine or bis-(3-aminopropyl) ethylenediamine curing agent and an effective amount of a polyether diureide additive having terminal ureido groups said diureide having the formula:

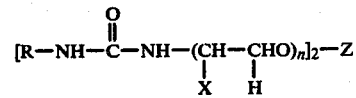

wherein R is hydrogen, or a branched or straight chain alkyl radical of from 1 to about 10 carbon atoms, or a monocyclic aryl, alkaryl or aralkyl radical having from 6 to about 12 carbon atoms; or, a branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

12. The resin of claim 11 wherein said curing agent is present in about a stoichiometric amount; and said additive is present in amount from about 2 to 50 parts by weight based on 100 parts by weight of said polyepoxide.

* * * * *